J. B. MOCKRIDGE.
GRAIN CAR DOOR.
APPLICATION FILED AUG. 24, 1907.
910,010.
Patented Jan. 19, 1909.
5 SHEETS—SHEET 5.
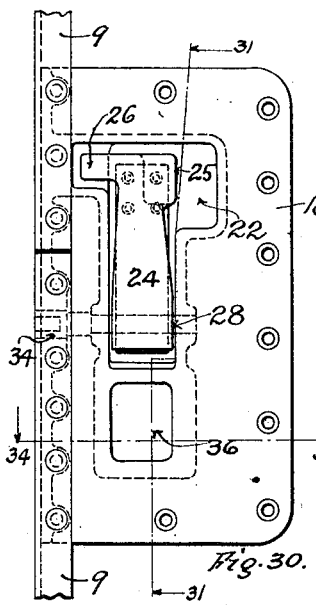
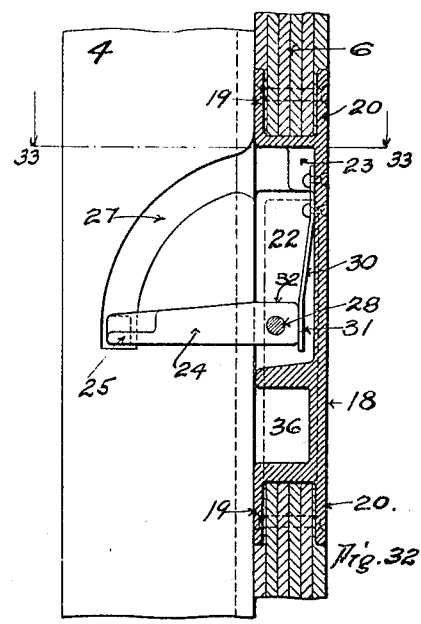
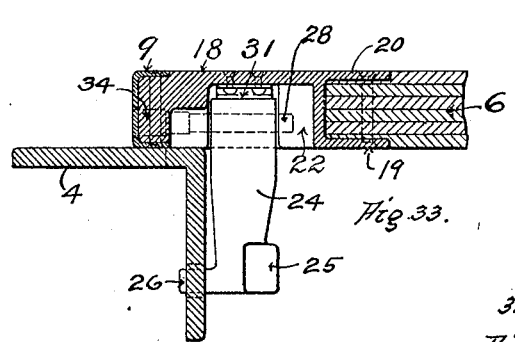
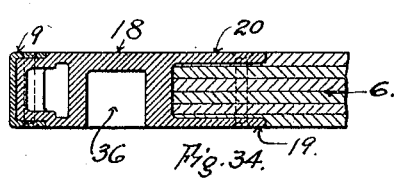
WITNESSES:
INVENTOR:
Joseph B. Mockridge

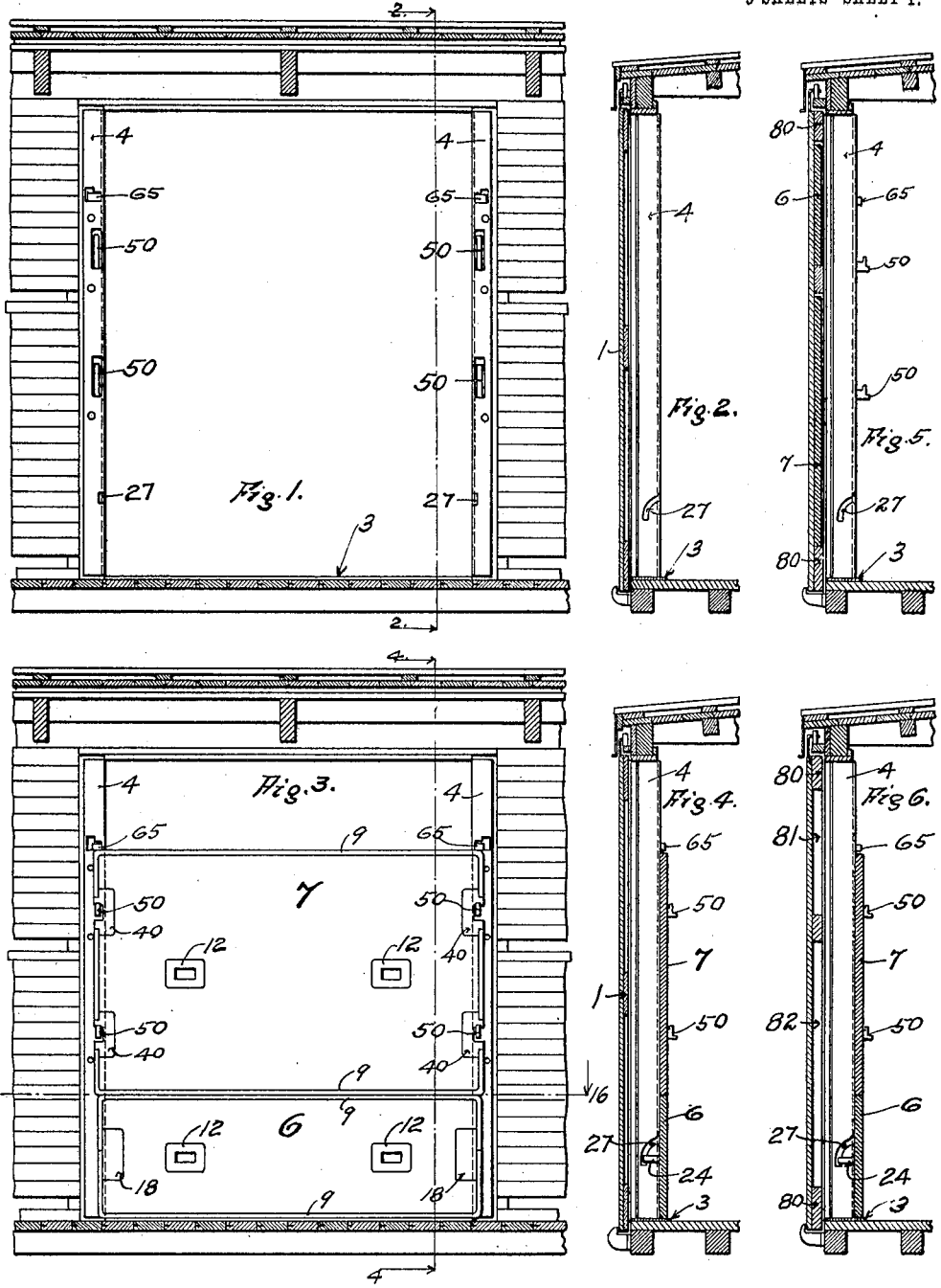

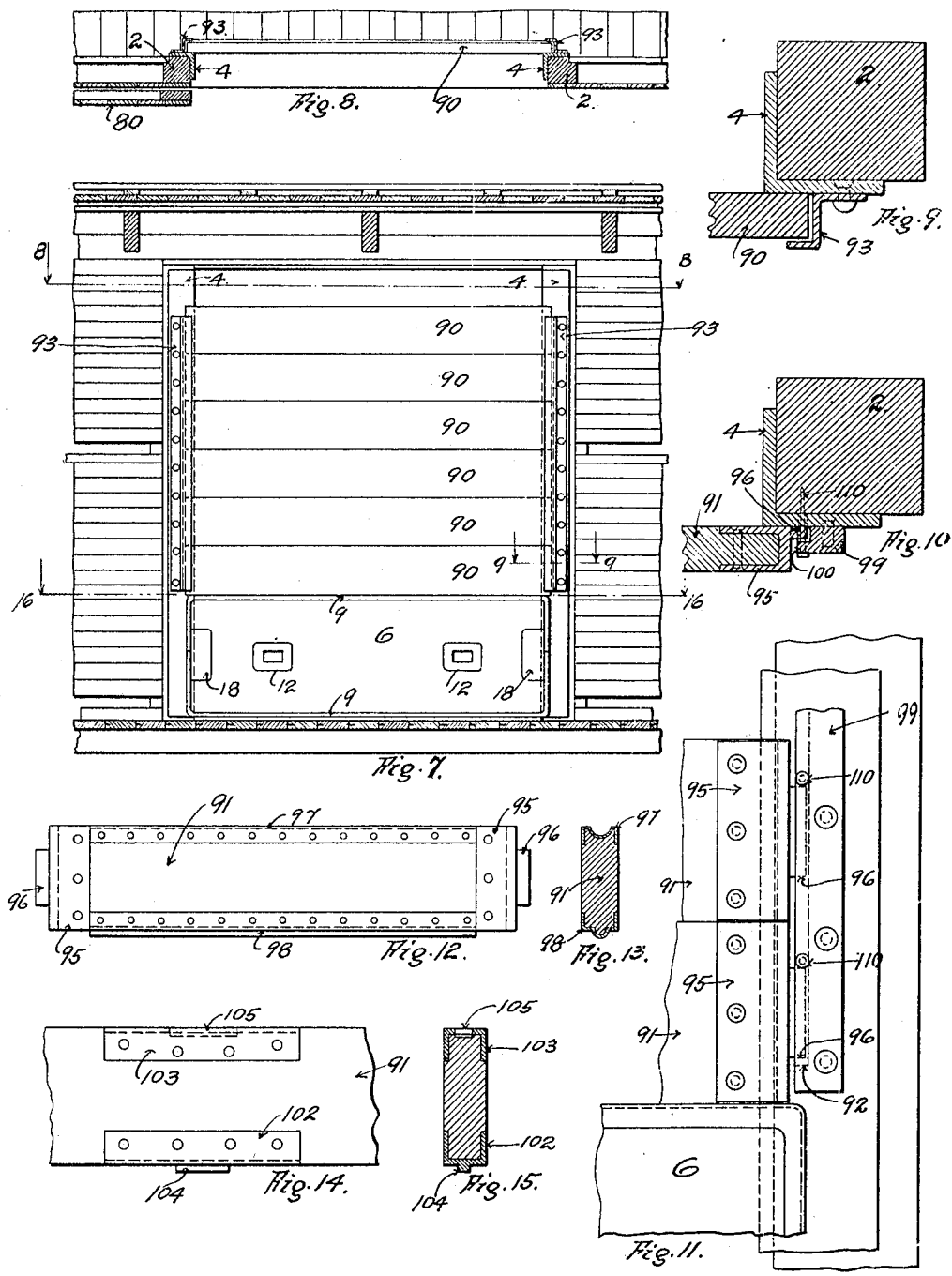

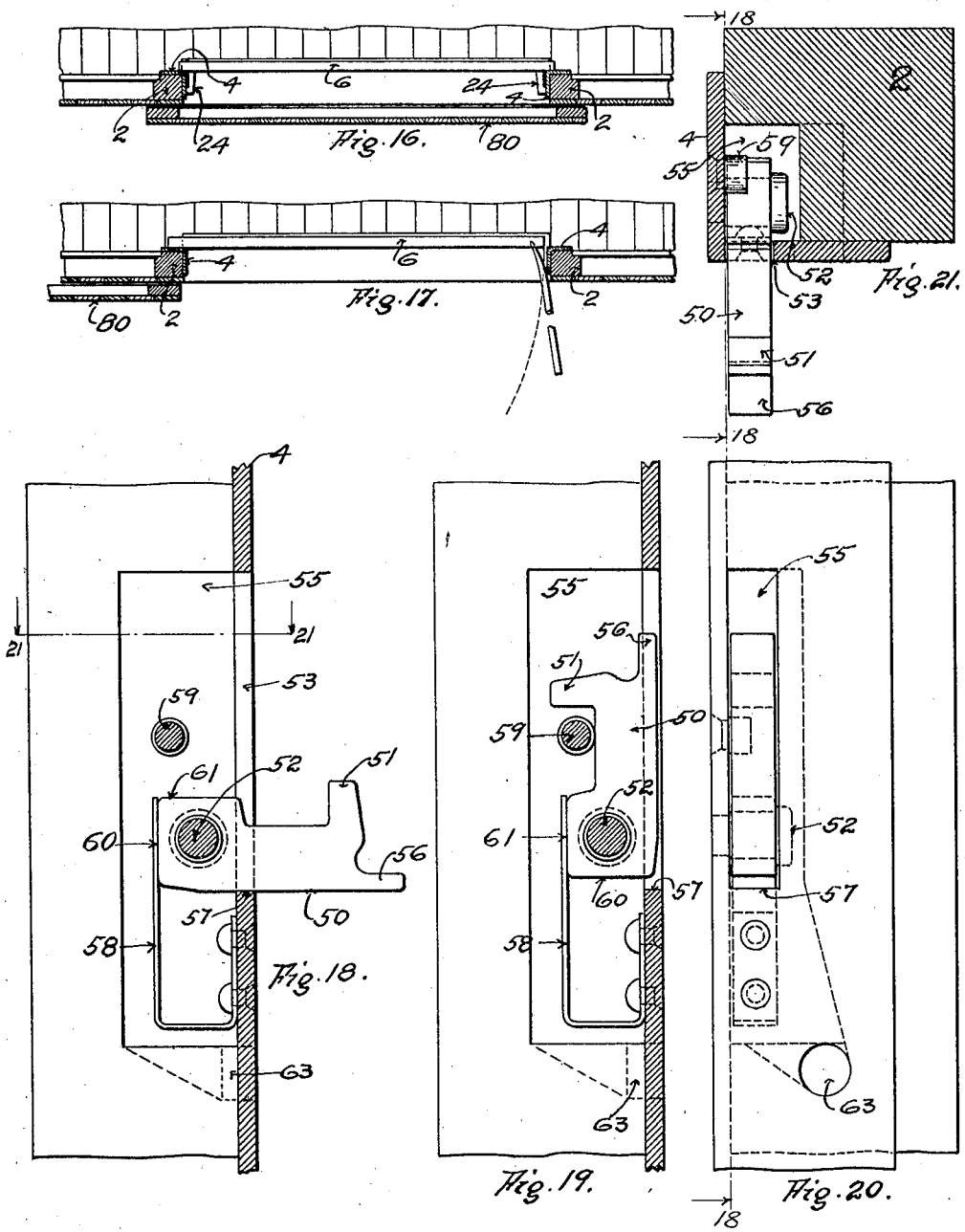

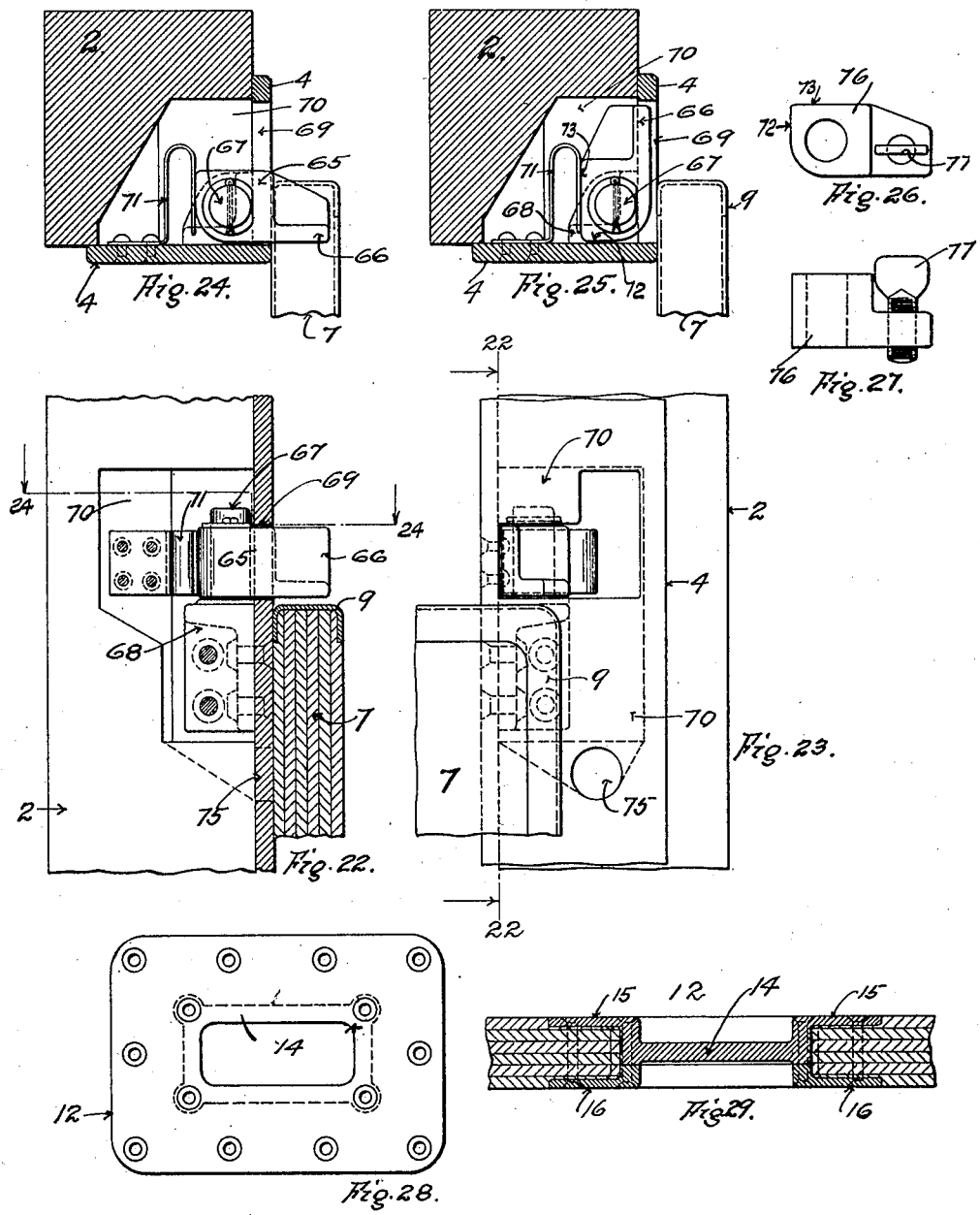

UNITED STATES PATENT OFFICE.

JOSEPH B. MOCKRIDGE, OF NEWARK, NEW JERSEY, ASSIGNOR OF ONE-THIRD TO HENRY A. VERGES, OF MILWAUKEE, WISCONSIN, AND ONE-THIRD TO CHARLES L. DUENKEL, OF EAST ORANGE, NEW JERSEY.

GRAIN-CAR DOOR.

No. 910,010.            Specification of Letters Patent.            Patented Jan. 19, 1909.

Application filed August 24, 1907. Serial No. 389,932.

*To all whom it may concern:*

Be it known that I, JOSEPH B. MOCKRIDGE, a citizen of the United States, residing at Newark, in the county of Essex and State of New Jersey, have invented certain new and useful Improvements in Grain-Car Doors, of which the following is a specification, reference being had to the accompanying drawing, forming a part thereof.

This invention relates to improvements in grain car doors, in which term however, is included not only doors for cars carrying grain, but also for cars carrying any other material in bulk, such as coal, potatoes, etc.

The purpose of the invention is to provide a door for such cars so constructed that the car can be quickly and readily unloaded without injuring the doors; that the doors shall be interchangeable among the cars of a line, so that a minimum number of doors will satisfy all the needs of the line; and that the doors shall be durable, easily applied and easily removed, and adapted to be stored and shipped from point to point as needed on the line with varying conditions of business.

Essentially the invention consists in a door which is in a plurality of parts, which parts I term "leaves". When these leaves are arranged across the doorway, one above the other, to form the door, the lowermost leaf is removably applied to the doorway and is capable of being moved independently of the other leaves lengthwise across the doorway, so that a little such motion will move one end of said leaf clear of the door post, whereupon the pressure of the contents of the car will tend to push it out, rendering the removal thereof easy. Proper supports for the upper leaf or leaves are provided, so that they remain in elevated position after the lowermost leaf has been removed, and thus an ample opening for quickly unloading the car is provided. As the cars are of standard sizes, the leaves and fittings will also be standardized, and hence the leaves will be interchangeable with any car, and can be used both with old and with new cars. Therefore, a railroad will need only to provide as many doors as its business in bulk freight requires, which doors can be stored at any convenient points along the line, to be put in cars as desired.

This invention is adapted to be applied in connection with the recessed main car doors described in Letters Patent of the United States, No. 679,855, dated August 6, 1901, and certain of the accompanying drawings show it so used; but of course, the invention is not limited to use with a recessed main door, and certain other of the accompanying drawings show it in cars with ordinary main doors.

This invention has great advantages over existing grain car doors which are adapted to be lifted vertically to open a space at the bottom for the discharge of the grain or other material. A considerable vertical movement is necessary to provide sufficient opening, and the enormous resistance to this movement offered by the pressure of the grain or the like on the doors, makes their opening slow and difficult, and often results in breaking the doors, while the doors themselves are in the way and troublesome. Another practice of closing the doorway of the car by nailing boards across it, one above the other, is unsatisfactory, the boards being difficult to remove when unloading a car, and being usually knocked or forced off by a sledge or crowbar and thereby broken, involving expense for lumber, and also being unsatisfactory as a door closure because of the difficulty of making a tight closure with the cheap lumber used. My doors however, as hereinbefore indicated, are easily applied and removed, so that the car can be quickly unloaded, are tight fitting, and are not in the way of the freight.

In the accompanying drawing like characters designate the same parts in the several figures.

Figure 1 is a partial vertical longitudinal section of a car showing a doorway fitted for my improved grain door as seen from within; Fig. 2 is a cross section on the line 2 2, Fig. 1, showing an ordinary door in connection with the doorway; Fig. 3 is a view similar to Fig. 1, showing the grain door in place in the doorway and ready for loading the car; Fig. 4 is a cross section on the line 4 4, Fig. 3, showing the grain door in place on the inner side of the doorway and an ordinary door on the outer side; Fig. 5 is a cross section similar to Fig. 2, showing a recessed main door and the leaves of the grain door in the recesses of the main door; Fig. 6 is a cross section similar to Fig. 5, showing the leaves of the grain door in place in the doorway; Fig. 7 is a partial vertical longitudinal section looking from the interior outward, of a car equipped with a modification of my improved grain door; Fig. 8 is a horizontal section on the line 8 8, Fig. 7; Fig. 9 is an enlarged horizontal section on the line 9 9, Fig. 7, of one of the door posts; Fig. 10 is a like section showing a modification; Fig. 11 is an elevation of the construction shown in Fig. 10 as seen from the inside of the car; Fig. 12 is an elevation and Fig. 13 a cross section of one of the upper leaves of the grain door; Fig. 14 is a broken or partial elevation, and Fig. 15 a cross section of a modification of the construction shown in Figs. 12 and 13; Fig. 16 is a horizontal section on the line 16 16, Figs. 3 and 7, showing locking devices fastening the lowermost leaf of the grain door to the door posts; Fig. 17 is a similar section showing the method of releasing the lowermost leaf and permitting it to open outward; Fig. 18 is an enlarged section on the line 18 18, Figs. 20 and 21, showing in operative position one of the disappearing levers which support the upper leaf or leaves of the grain door when the lowermost leaf is removed; Fig. 19 is a similar view showing said lever turned back into the recess in the door post; Fig. 20 is a side elevation of the parts shown in Figs. 18 and 19 as viewed from the right with reference thereto; Fig. 21 is a cross section on the line 21 21, Fig. 18; Fig. 22 is a vertical section on the line 22 22, Fig. 23, showing in operative position one of the holding-down levers with which the door posts are provided above the grain door to prevent upward displacement of the same; Fig. 23 is an elevation of the parts shown in Fig. 22 as viewed from the right; Figs. 24 and 25 are sections on the line 24 24, Fig. 22, showing the holding-down lever turned out into operative position and turned back into its recess; Figs. 26 and 27 are an enlarged plan view and a side elevation respectively of a modification of the holding-down lever; Figs. 28 and 29 are a front elevation and a horizontal section respectively of a double hand hole or recessed plate with which some or all of the grain door leaves are provided; Fig. 30 is a front elevation on a large scale showing in retracted position one of the swinging locking bars by which the lowermost leaf of the grain door is secured to the door posts; Fig. 31 is a section on the line 31 31, Fig. 30; Fig. 32 is a similar section showing the locking bar turned into locking position in engagement with the adjoining door post; Fig. 33 is a horizontal section on the line 33 33, Fig. 32; Fig. 34 is a section on the line 34 34, Fig. 30; Fig. 35 is a side elevation on a large scale of one of the recessed plates applied to the ends of the upper leaves of the grain door; Fig. 36 is an elevation of the same as seen from the right with reference to Fig. 35; and Fig. 37 is a section on the line 37 37, Fig. 35.

Referring to that form of my invention illustrated in Figs. 1, 2, 3, and 4, and in the detail views relating thereto, 1 is an ordinary main car door sliding in the usual manner on the outside of the car, and 2 2, the door posts protected by the angle irons 4, which are provided with devices to be used in connection with the grain door, as hereinafter described. 3 is a broad metal sill, on which the lower leaf of the grain door is supported, and on which said leaf slides endwise as hereinafter described. Said grain door is composed of a plurality of leaves 6, 7, which when in use as a door, are placed one above the other as seen in Fig. 3. When two leaves are used, as shown in Figs. 3, 4, and 6, the lower leaf will preferably be the narrower, the total width of the two leaves being sufficient to permit loading the car to any desired height. Said leaves will be constructed of any suitable material, and preferably of wood laminated, as seen, for example, in Figs. 22 and 29, and the edges will be protected by metal rims 9, this construction insuring great stiffness and durability, with lightness.

The height of said lowermost leaf 6 is such that when said leaf is removed there will be an ample opening for the quick unloading of the car. I prefer to provide the leaves 6 and 7 with double hand hole plates 12 (Figs. 3, 28 and 29). The plates 12 are preferably constructed with the web 14 and angled flanges 15 15, in one piece, to which are secured by countersunk rivets the angled flanges 16 16 (Fig. 29), said flanges being secured to the leaves 6 and 7 by countersunk bolts or rivets as shown. Thus recesses for the hands or for a tool are formed in both sides of said leaves, and particularly in the upper leaves, which are reversible.

When said grain door is first applied to the doorway, before the car is loaded, it is desirable to have some means of holding the lower leaf 6 to the door posts, and I prefer the following device: A recessed plate 18 with peripheral flanges 19 20, between which the body of said leaf is secured by countersunk bolts, as indicated in Figs. 31, 32, 33 and 34, is provided at each end of said leaf, as shown in Figs. 1 and 7. In a recess 22 in the outer side of each plate 18 is pivoted on a pin 28, a swinging locking bar 24, which is provided with a depressed thumb piece 25 and a head 26 adapted to engage with a curved groove 27 in the angle iron 4 of the adjoining door post 2 when the locking bar is turned outward. The locking bar 24, which is preferably shaped as shown, is retained both in locking position (Figs. 32 and 33,) and in retracted position in recess 22 (Figs. 30, 31) by a stiff spring 30 bearing on the surface 31 or 32 of said locking bar, accordend pieces 95 provided with tongues 96 loosely fitting in the guide irons. The tongues 96 may be of less length than the width of said boards 91, as shown in Figs. 11 and 12. The leaves 91 may also have metal reinforcing plates 97, 98, on their top and bottom edges, one being tongued and the other grooved, as shown in Fig. 13, to make a tight fit, board with board, and to prevent one board from bulging outward beyond another.

Fig. 10 shows a preferred form of guide which consists of a vertical bar 99 provided with a flange 100 on its inner edge, forming a guide groove for the ends of the boards, and the whole construction is such that the several parts project as little as possible into the car beyond the faces of the door posts 2, and all corners may be rounded to diminish the liability of anything catching thereon; it being an object of the invention throughout to leave the interior of the car as clear and free from projections as possible. Instead of a long tongue and groove on the long edges of the boards or leaves, reinforcing pieces 102, 103, formed with a short tongue 104, and with a groove 105 respectively, and secured to the middle length of the boards as seen in Figs. 14 and 15, may be employed to prevent the bulging out of any board or leaf.

It will be apparent from the foregoing description that the various levers, stops and locking devices are so arranged that when not in use, as when a car is used for other than bulk freight, all of said devices may be turned back into recesses in the grain doors or door posts, so as to leave the surfaces thereof without projections, as clearly illustrated in Figs. 19, 25 and 31, thereby greatly promoting convenience in the use of the cars for miscellaneous freight and reducing danger of injury to such devices.

The invention is used and operated in the following manner: To load an empty car with grain, the lower leaf 6 is first applied and secured to the door posts by the swinging locking bars 24. The levers 50 having been thrown to operative position, the leaf 7 is then placed upon leaf 6, said levers 50 entering the recesses 41 in the ends of leaf 7, and the stops 65 are turned to operative position over the upper edge of said leaf, the heads 51 of the levers 50 holding the leaf 7 upright. Now the grain is run into the car from an elevator spout over the top of the grain door in the ordinary manner, and the pressure of the grain together with said locking bars, levers and stops, holds the parts of the door securely in place until the car reaches its destination. To unload, the locking bars 24, which are readily accessible from outside the car when the main door 1 is open, are turned back into their recesses 22 in the leaf 6. A pinch bar is then inserted in one of the recesses 36 and said leaf is moved endwise until one of its ends clears the adjacent door post, whereupon the pressure of the grain will push that end outward so that the other end can be readily withdrawn from the other door post, the levers 50 preventing the upper leaf 7 from falling down. Thus an ample opening is afforded for the quick discharge of the grain, and it will soon be possible to reach in, turn back the stops 65, and remove the upper leaf 7, if desired.

The operation of the construction illustrated in Figs. 7 to 15 will be clearly understood without further description. When however, the upper part of the grain door is composed of narrow boards or leaves, and particularly when the reinforced boards 91 (shown in Figs. 10 and 11) are used, I prefer to form inclined holes in the guides 99 a little above the normal positions of the upper ends of the tongues 96, thus allowing for possible variation in the width of the boards. When the boards 91 are in place in the guides 99, nails or pins 110 are thrust tightly into said holes, and prevent upward displacement of said boards. I may also, of course, use the inclined holes and nails in connection with the two leafed door of Figs. 1 to 4, in place of the stops 65.

I claim:

1. The combination with car door posts of a door comprising a plurality of separately removable leaves adapted to be arranged one above another across the door opening and to engage at their ends with the inner sides of said posts, the lower leaf being movable endwise to clear one of the posts, whereupon it is free to swing outward on and clear the other post, and means for supporting the upper part of the door in place when the lower leaf is removed, substantially as described.

2. The combination with car door posts of a door comprising a plurality of separately removable leaves adapted to be arranged one above another across the door opening and to engage at their ends with the inner sides of said posts, the lower leaf being movable endwise to clear one of the posts, whereupon it is free to swing outward on and clear the other post, means for supporting the upper part of the door in place when the lower leaf is removed, and fastenings accessible from the outside for securing the lower leaf to said posts, substantially as described.

3. The combination with car door posts of a door comprising a plurality of separately removable leaves adapted to be arranged one above another across the door opening, the lower leaf being made to lap at the ends the inner sides of said posts and being movable endwise to clear one of the posts, whereupon it is free to swing outing as said locking bar is in the one or the other position. The pin 28 has an enlarged head 34 threaded in the plate 18 and provided with a square hole for a tool, so that it can be unscrewed from the end of the leaf 6 and both the pin and the locking bar 24 can be easily removed for repairs. The plate 18 is also formed with a recess 36 to receive the end of a pinch bar, in order to move said leaf 6 endwise clear of the adjacent door post and permit it to open outward for unloading a car. The leaf 6 being set up on edge against the inner faces of the angle irons 4 on the door posts and being of proper length to reach across the doorway and lap the posts at its ends, each of the locking bars 24 are pulled downwardly and outwardly by reaching a finger into the recess 22 which is large enough for this purpose, grasping the thumb piece 25 and drawing the locking bar forward so that its head 26 will swing down in the groove 27 and thereby hold said leaf in place while the car is being loaded. When the car is loaded the pressure of the grain or other bulk material against said leaf will hold it in place and said locking bars will prevent it from being accidentally jolted endwise.

The upper leaf 7 is provided at the ends with plates 40 having open recesses 41 (Figs. 3 and 35) to receive the swinging levers 50, said plates 40 being provided with flanges 42 forming grooves in which the material of said leaf is fastened by countersunk bolts, as shown in Fig. 37. Said recesses 41 are of such dimensions and so positioned that when the door is in use there is clearance all around said levers 50, as shown in Fig. 35, so that no strain comes on said levers 50. The levers 50 having hooks 51 and thumb pieces 56, are pivoted on studs 52 on one side of an angle iron 4, and work through vertical slots 53 in the other side of said angle iron, the door post 2 being recessed, as at 55, to permit of the insertion and movement of said levers. Each lever 50 is maintained both in its upturned position shown in Fig. 19 against a stop 59, and in its working position as shown in Fig. 18 against the lower end 57 of the slot 53, by a stiff spring 58 engaging surfaces 60, 61, according as said lever is in one or the other position, and at the bottom of each recess 55 is a self-emptying hole 63 opening through the angle iron 4 into the interior of the car, so that any grain or other material which may drop into the said recess will be discharged therefrom through said hole. I prefer also to employ swinging stops to aid in preventing the upper leaves of the door from jumping or moving upward. Referring to Figs. 22 to 25, these stops 65 are provided with thumb catches 66, and are pivoted on pins 67 of fittings 68, which are secured to the angle irons 4 by countersunk bolts or rivets, said irons 4 and the posts 2 being slotted and recessed at 69, 70, respectively, to permit of the proper working of said stops. Said stops 65 are retained in their retracted and working positions respectively, as shown in Figs. 25 and 24, by springs 71, which bear on surfaces 72 and 73 of said stops according to their positions. Each recess 70 communicates at the bottom with a hole 75 which opens through the angle iron 4 for the discharge of any material that may have fallen into said recess.

In Figs. 26 and 27 is shown a stop 76, which is provided with a thumb screw 77 which can be turned down against the top edge of the uppermost leaf or board of the grain door. This form of stop is advantageous where it is desirable to allow for considerable variation in the total height of the grain door, the stop 76 being in other respects similar and similarly arranged to said stop 65.

The grain door may be used either in cars which are fitted with the ordinary main doors 1, or with my improved recessed main doors 80, as shown in Figs. 5 and 6. In this case, when the grain doors are not in use, as when the car is used for other than bulk freight, the leaves of the grain door will be carried in recesses 81, 82, provided for the purpose in the door 80, as shown in Fig. 5.

In the construction hereinbefore described the upper part of the grain door consists of a single leaf, but it may be made in a number of leaves, each of which may, if desired, be a comparatively narrow board. Several constructions of this character are illustrated in Figs. 7 to 15 inclusive.

Referring to Figs. 7, 8 and 9, the upper part of said grain door is constructed of a number of narrow leaves or boards 90. Any desired number of these will be placed one above another across the doorway against the inside of the door posts and above the leaf 6 to form a grain door of the desired height. The boards or leaves 90 may be secured in place while loading the car in any desired manner, as by the Z-guide irons 93, fastened to the angle irons 4 of the door posts 2 (Figs. 7 and 9). The guide irons 93 will terminate a sufficient distance below the roof of the car to permit of the ready insertion of the leaves in the guides, and they will also have shoulders 92 at their lower ends to hold up the leaves 90 or 91 when the lower leaf 6 of the grain door is taken out for unloading, there being preferably a little clearance between said shoulders and the ends or tongues of the boards 90 or 91, and also clearance between the lower ends of said Z-irons and the top of said leaf 6, as shown in Fig. 11.

While plain boards may be used, I prefer to employ specially reinforced boards 91 (Figs. 10 to 13) which have flanged metal ward on and clear the other post, fastenings pivoted in recesses in the outer face of the lower leaf adjacent to its ends and adapted to be turned outwardly into engagement with curved slots in the door posts, and means for supporting the upper part of the door in place when the lower leaf is removed, substantially as described.

4. The combination with car door posts of a door comprising a plurality of separately removable leaves adapted to be placed one above another across the door opening, the lower leaf being made to lap at its ends the inner sides of said posts and being movable endwise to clear one of the posts, whereupon it is free to swing outward on and clear the other post, recessed metal plates sunk into the outer face of the lower leaf, fastenings pivoted in said plates and adapted to be swung outwardly therefrom into engagement with grooves in the door posts, and springs arranged to hold said fastenings in their projected and retracted positions, substantially as described.

5. The combination with car door posts having angle iron facings on their inner sides, of a door comprising a plurality of separately removable leaves adapted to be placed one above another across the door opening, the lower leaf being made to lap at its ends the inner sides of the posts and being movable endwise to clear one of the posts, whereupon it is free to swing outward on and to clear the other post, recessed metal plates sunk into the outer face of the lower leaf adjacent to its ends, and fastenings pivoted in said plates and adapted to close into the recesses therein and when swung outward to engage with grooves in said angle iron facings, substantially as described.

6. The combination with car door posts, of a door comprising a plurality of separately removable leaves adapted to be arranged one above another across the door opening, the lower leaf being made to lap at its ends the inner sides of the door posts and being removable endwise to clear one of the posts, whereupon it is free to swing outward and to clear the other post, means for supporting the upper part of the door in place when the lower leaf is removed, and means for holding the lower leaf in place across the door opening, said lower leaf being provided in its outer face adjacent to one end with a recess to receive the end of a prying tool, substantially as described.

7. The combination with car door posts, of a door comprising a plurality of separately removable leaves adapted to be placed one above another across the door opening, the lower leaf being made to lap at its ends the inner sides of the door posts and being movable endwise to clear one of the posts, whereupon it is free to swing outward on and to clear the other post, metal plates sunk into and secured in the outer face of the lower leaf adjacent to its ends and formed with recesses for fastenings and a recess to receive the end of a prying tool, fastenings for securing the lower leaf to the door posts pivoted to said plates and adapted to close into recesses therein, and means for supporting the upper part of the door in place when the lower leaf is removed, substantially as described.

8. The combination with car door posts having recesses in the inner sides, of a door comprising a plurality of separately removable leaves adapted to be placed one above another across the door opening, the lower leaf being made to lap at the end the inner side of the posts and being movable endwise to clear one of the posts, whereupon it is free to swing outward on and to clear the other post, the upper leaf having recesses in the ends and hooked fastenings pivoted in the recesses of the posts and adapted to be projected therefrom through the recesses in the ends of the upper leaf, substantially as described.

9. The combination with car door posts, of a door comprising a plurality of separately removable leaves adapted to be arranged one above another across the door opening, the lower leaf being made to lap at its ends the inner sides of the posts and being movable endwise to clear the other post, and means for supporting the upper part of the door in place when the lower leaf is removed, the upper leaf being reversible and provided with hand openings in opposite sides thereof, substantially as described.

10. The combination with car door posts, of a door comprising a plurality of separately removable leaves adapted to be arranged one above another across the door opening, the lower leaf being made to lap at its ends the inner sides of the posts and being movable endwise to clear one of the posts, whereupon it is free to swing outward on and to clear the other post, and means for supporting the upper part of the door in place when the lower leaf is removed, the upper leaf being reversible and provided with inset metal plates having hand holes in their opposite sides, substantially as described.

11. The combination with door posts having recesses in their inner sides and slotted angle iron facings, of a door comprising a plurality of separately removable leaves adapted to be placed one above another across the door opening, the lower leaf being made to lap at its ends the inner sides of the posts and movable endwise to clear one of the posts, whereupon it is free to swing outward on and to clear the other post, fastenings pivoted in recesses in the outer side of the lower leaf adjacent to its ends and adapted to be turned outwardly into engagement with slots in said facings, the upper leaf having recesses in the ends, hooked fastenings pivoted in recesses in the posts and adapted to be projected therefrom into the recesses in the ends of the upper leaf, stops pivoted in recesses in the posts and adapted to be projected therefrom into position to prevent upward displacement of the door, and springs adapted to hold said fastenings and stops in their retracted positions within the recesses of the lower leaf and of the posts and in their projected or working positions, substantially as described.

In witness whereof I hereto affix my signature in presence of two witnesses.

JOSEPH B. MOCKRIDGE.

Witnesses:
  OSCAR P. WILLMANN,
  ANTHONY J. GRIFFIN.